(12) United States Patent
Chi

(10) Patent No.: US 6,435,726 B1
(45) Date of Patent: Aug. 20, 2002

(54) BOTTOM BRACKET ASSEMBLY FOR BICYCLES

(76) Inventor: Yi-Chen Chi, No. 139-5, An-Mei Rd., Mei-Shan Village, Houli Hsiang, Taichung Hsien (TW)

( * ) Notice: Subject to any disclaimer, the term of this patent is extended or adjusted under 35 U.S.C. 154(b) by 0 days.

(21) Appl. No.: 09/784,104

(22) Filed: Feb. 15, 2001

(30) Foreign Application Priority Data

Dec. 22, 2000 (TW) .................................. 089222524 U

(51) Int. Cl.[7] ............................................. F16C 13/00
(52) U.S. Cl. ..................................... 384/545; 384/540
(58) Field of Search .............................. 384/545, 589, 384/540, 537, 543

(56) References Cited

U.S. PATENT DOCUMENTS

| | | | | |
|---|---|---|---|---|
| 4,810,040 A | * | 3/1989 | Chi | 301/110.5 |
| 5,106,210 A | * | 4/1992 | Chi | 384/498 |
| 5,233,885 A | * | 8/1993 | Lin et al. | 384/512 |
| 5,572,909 A | * | 11/1996 | Chi | 384/458 |
| 6,042,274 A | * | 3/2000 | Lin | 384/458 |
| 6,095,691 A | * | 8/2000 | Chiang | 384/458 |
| 6,116,114 A | * | 9/2000 | Edwards | 280/259 |
| 6,139,192 A | * | 10/2000 | Chiang | 384/458 |
| 6,212,774 B1 | * | 4/2001 | Ohtsu | 29/898.063 |
| 6,267,452 B1 | * | 7/2001 | Lin | 301/110.5 |

* cited by examiner

Primary Examiner—Christopher P. Schwartz
Assistant Examiner—Devon Kramer
(74) Attorney, Agent, or Firm—Rosenberg, Klein & Lee

(57) ABSTRACT

A bicycle bottom bracket assembly includes an outer tube connected to a bicycle frame and a first inner threaded section and a second inner threaded section are respectively defined in an inner periphery of two ends of the outer tube. An inner tube is received in the outer tube and a first end of the inner tube has a first outer threaded section so as to be engaged with the first inner threaded sections. A flange extends from a second end of the inner tube so that a ball bearing is mounted to the flange. A roller bearing is engaged with an inner periphery of the first end of the inner tube. A positioning ring is engaged with the second inner threaded section of the outer tube. An axle extends through the roller bearing and the bearing.

1 Claim, 4 Drawing Sheets

BOTTOM BRACKET ASSEMBLY FOR BICYCLES

FIELD OF THE INVENTION

The present invention relates to a bicycle bottom bracket assembly and a roller bearing is connected to an end of the axle and the chainwheel is connected to the end of the axle.

BACKGROUND OF THE INVENTION

A conventional bicycle bottom bracket 40 is shown in FIG. 4 and generally includes an outer tube 50 connected to the bicycle frame and an inner tube 42 is received in the outer tube 50 with an axle 41 extending through the inner tube 42. Two bearings 43 are respectively mounted to two ends of the axle 41 and two crank arms (not shown) are respectively connected to the two ends of the axle 41. Two ball securing rings 44 are respectively mounted to the two ends of the axle 41 and connected to two ends of the outer tube 50 to position the axle 41. The assembly for the bottom bracket is used for a long time. However, it is difficult to assemble the two ball bearings 43 in balance and precise. A chainwheel (not shown) is connected to one end of the axle 41 so as to be engaged with a chain which is connected to the other chainwheel co-rotatably mounted to rear wheel axle. The ball bearings 43 provide only point contact with the inner tube 42 and the axle 41 so that the rider rotates the crank arms, the ball bearing 43 on the end where the chainwheel is mounted is applied a larger force which could loosen the bearing 43 and affect the smoothness of the rotation of the axle 41.

The present invention intends to provide a bottom bracket assembly that uses a roller bearing on the end where the chainwheel is mounted and the inner tube has a flange to initially position the ball bearing on the other end of the axle.

SUMMARY OF THE INVENTION

In accordance with one aspect of the present invention, there is provided a bicycle bottom bracket assembly and comprising an outer tube connected to a bicycle frame and a first inner threaded section and a second inner threaded section are respectively defined in an inner periphery of two ends of the outer tube. An inner tube is received in the outer tube and a first end of the inner tube has a first outer threaded section so as to be engaged with the first inner threaded sections. A flange extends from a second end of the inner tube and a ball bearing is mounted to the flange. A roller bearing with a ring mounted thereto and the ring is engaged with an inner periphery of the first end of the inner tube. A positioning ring has a second outer threaded section which is engaged with the second inner threaded section of the outer tube. An axle extends through the roller bearing and the ball bearing.

The primary object of the present invention is to provide a bicycle bottom bracket assembly wherein the inner tube has a flange which initially position the ball bearing and makes the assembly simplified.

The other object of the present invention is to provide a bicycle bottom bracket assembly wherein a roller bearing is mounted to an end of the axle and a chainwheel is mounted to the end of the axle.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
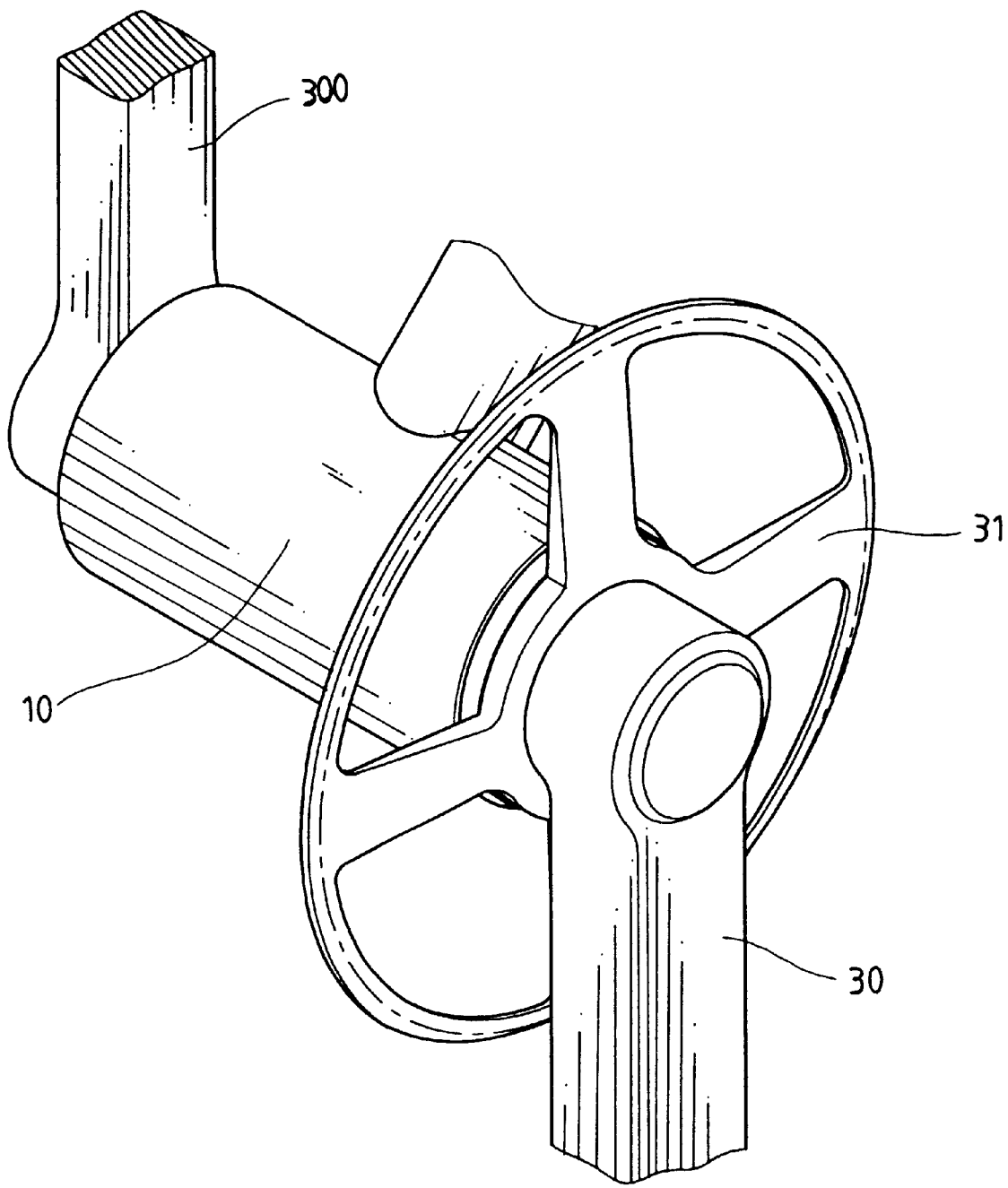
FIG. 1 is a perspective view to show a bicycle bottom bracket assembly of the present invention.
Figure 2:
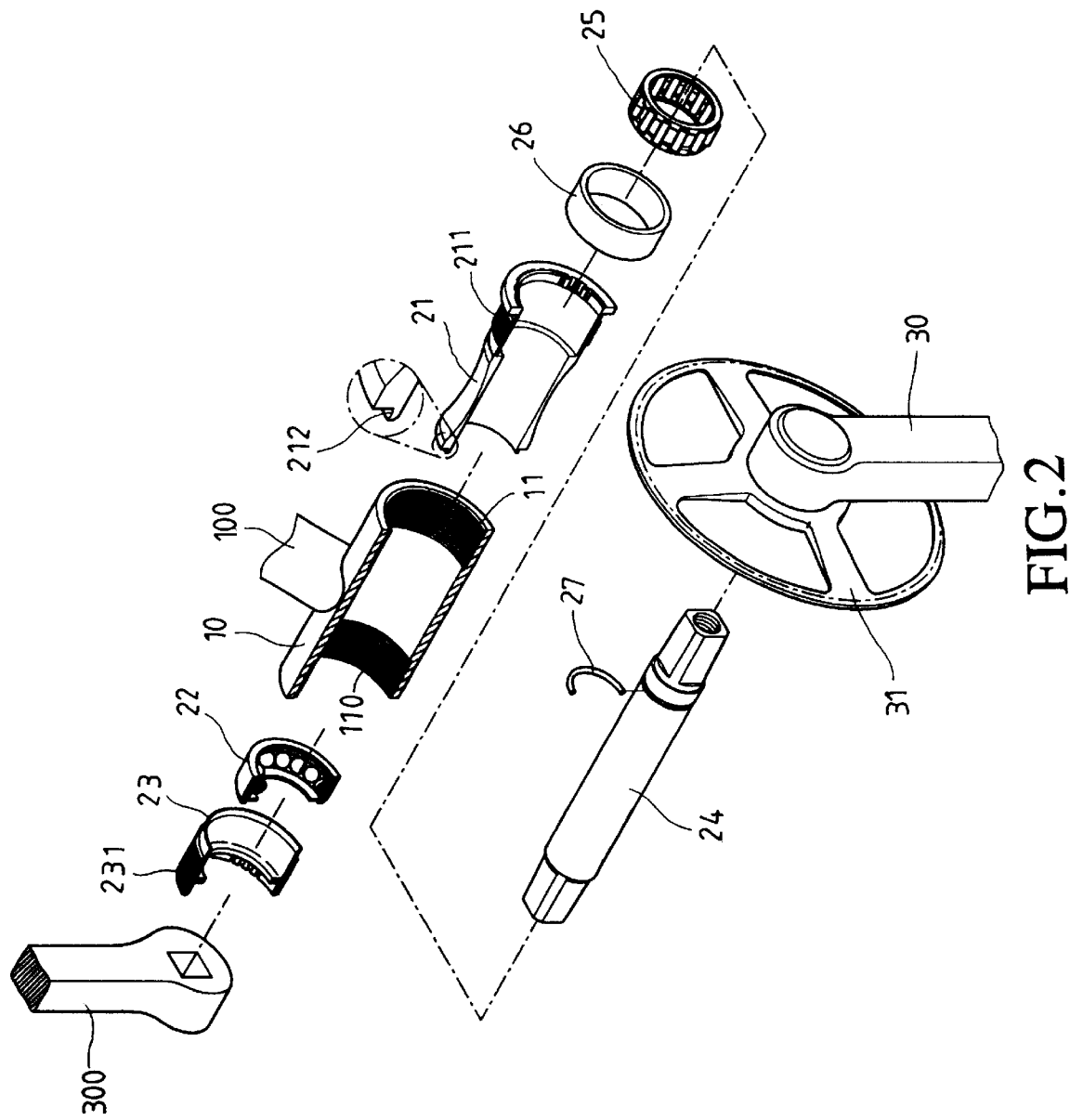
FIG. 2 is an exploded view to show the bicycle bottom bracket assembly of the present invention.
Figure 3:
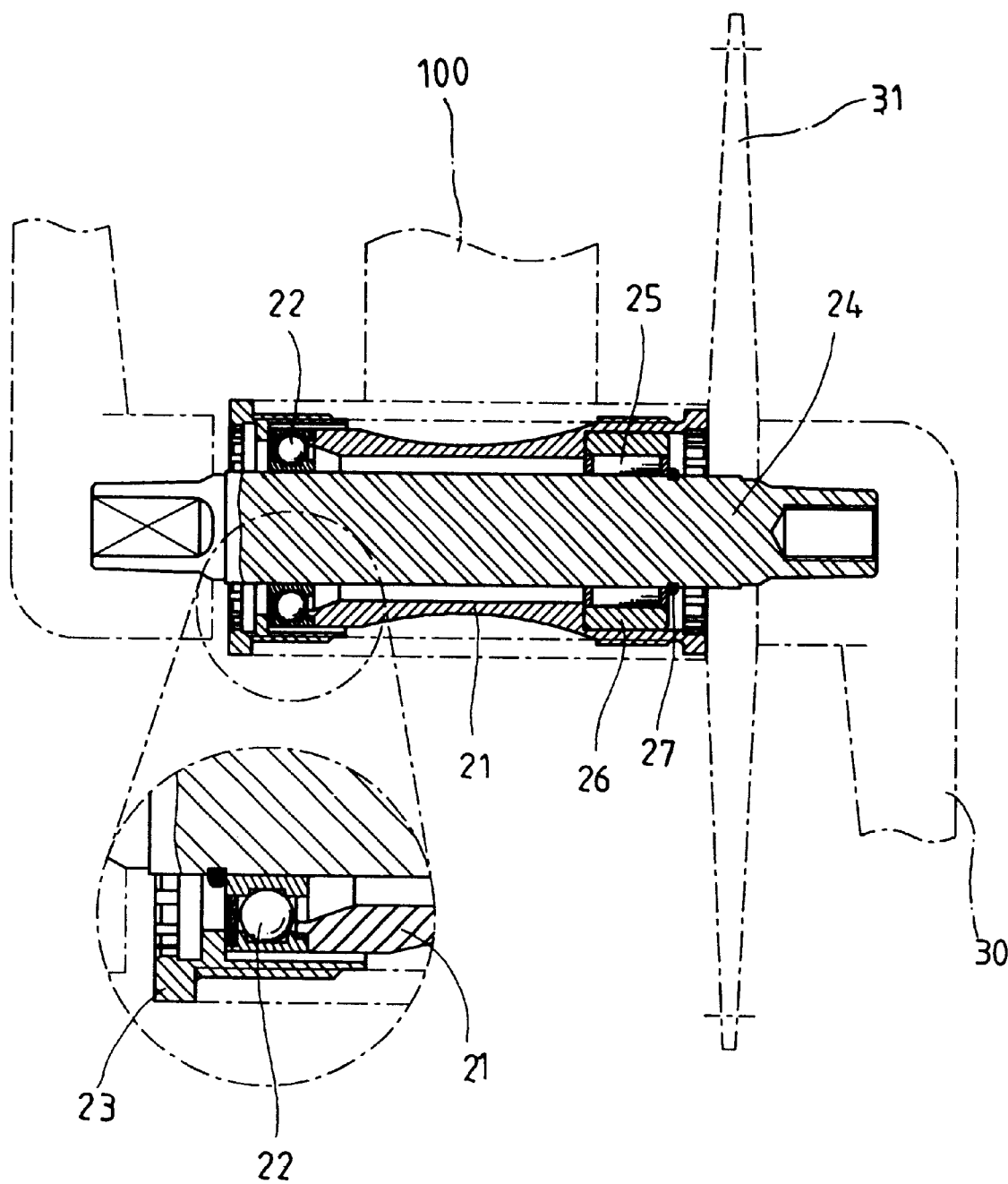
FIG. 3 is a cross sectional view to show the bicycle bottom bracket assembly of the present invention.
Figure 4:
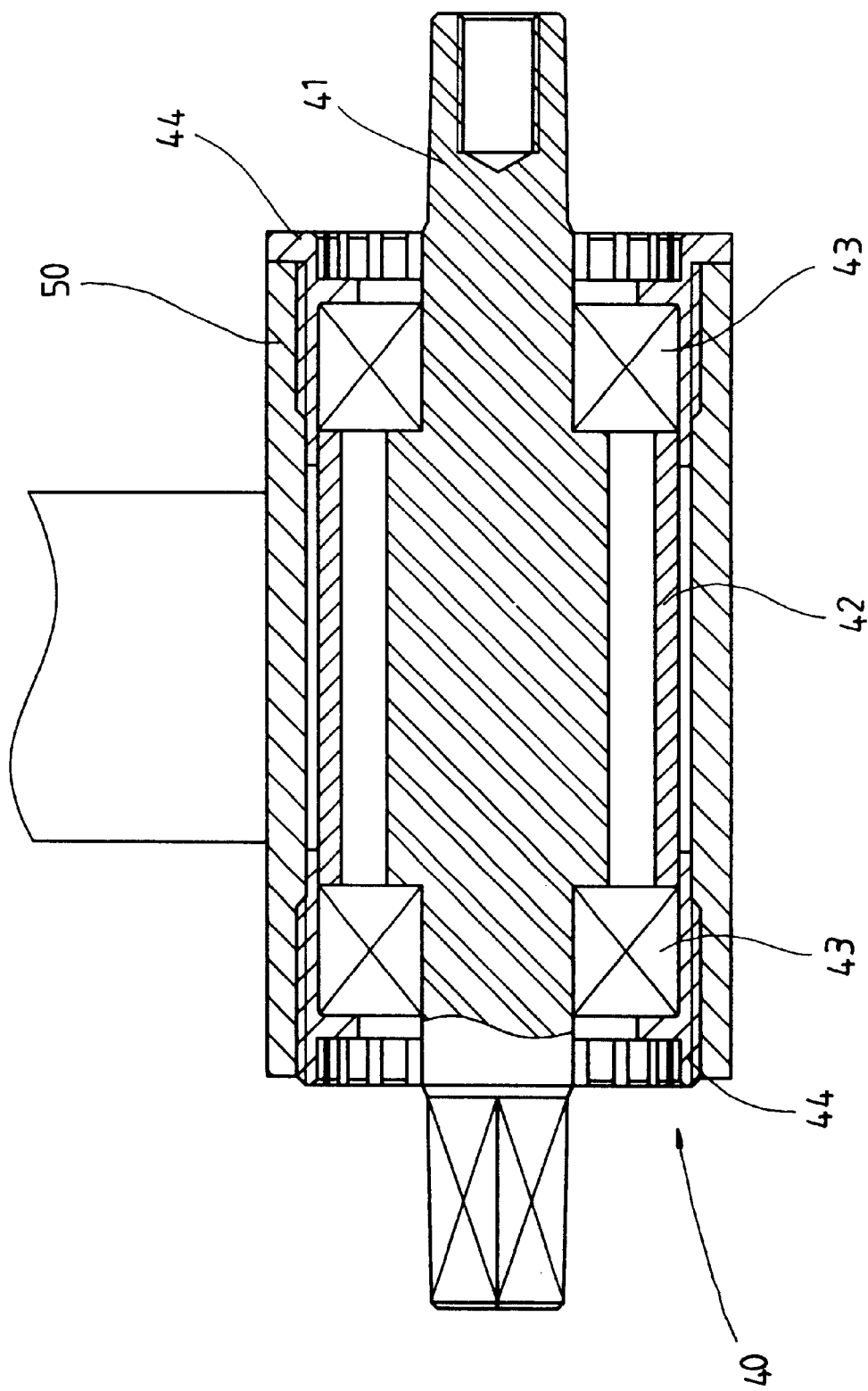
FIG. 4 is a cross sectional view to show a conventional bicycle bottom bracket assembly.

Referring to FIGS. 1 to 3, the bicycle bottom bracket assembly, of the present invention comprises an outer tube 10 connected to a bicycle frame 100 and a first inner threaded section 11 and a second inner threaded section 110 are respectively defined in an inner periphery of two ends of the outer tube 10. An inner tube 21 is received in the outer tube 10 and a first end of the inner tube 21 has a first outer threaded section 211 so as to be engaged with the first inner threaded sections 11 of the outer tube 10. A flange 212 extends from a second end of the inner tube 21 so that a ball bearing 22 is easily mounted to the flange 212 and is initially positioned.

A roller bearing 25 with a ring 26 mounted thereto which is engaged with an inner periphery of the first end of the inner tube 21. A positioning ring 23 has a second outer threaded section 231 which is engaged with the second inner threaded section 110 of the outer tube 10 to position the ball bearing 22. An axle 24 extends through the roller bearing 25 and the bearing 22. A C-shaped clamp 27 is securely mounted to the axle 24 to position the roller bearing 25 and the ring 26.

Two crank arms 30, 300 are respectively mounted to two ends of the axle 24 and a chainwheel 31 is mounted to the end of the axle 24 wherein the roller bearing 25 is located close to the arm 30. The roller bearing 25 provide a wider and larger contact area so that the roller bearing 25 is not loosened under the frequent downward force applied by users to rotate the crank arm 30. The flange 212 on the inner tube 21 has an advantage which allows the ball bearing 22 to be easily positioned during the assembling processes.

While we have described the embodiment in accordance with the present invention, it should be clear to those skilled in the art that further embodiments may be made without departing from the scope and spirit of the present invention.

What is claimed is:

1. A bicycle bottom bracket assembly comprising:

an outer tube adapted connected to a bicycle frame and a first inner threaded section and a second inner threaded section defined in an inner periphery of two ends of said outer tube, an inner tube received in said outer tube and a first end of said inner tube having a first outer threaded section so as to be engaged with said first inner threaded sections of said outer tube, a flange extending from a second end of said inner tube;

a roller bearing and a ring mounted to said roller bearing, said ring engaged with an inner periphery of said first end of said inner tube, a positioning ring having a second outer threaded section which is engaged with said second inner threaded section of said outer tube, a bearing mounted to said flange of said inner tube, and an axle extending through said roller bearing and said bearing.

* * * * *